A. H. DES PAROIS.
HEATING APPARATUS.
APPLICATION FILED APR. 21, 1921.

1,422,088.

Patented July 11, 1922.

Inventor
A.H.Des Parois
By
Attorney

UNITED STATES PATENT OFFICE.

ARISTIDE HARRY DES PAROIS, OF MONTREAL, QUEBEC, CANADA.

HEATING APPARATUS.

1,422,088. Specification of Letters Patent. Patented July 11, 1922.

Application filed April 21, 1921. Serial No. 463,240.

*To all whom it may concern:*

Be it known that I, ARISTIDE HARRY DES PAROIS, a British subject, residing at #217 Boyer Street, in the city of Montreal, in the Province of Quebec, in the Dominion of Canada, have invented certain new and useful Improvements in Heating Apparatus; and I do hereby declare that the following is a full, clear, and exact description of the same.

The present invention relates to improvements in heating apparatus, particularly in furnaces of the horizontal type; and the main object is to increase the heating efficiency of such furnaces.

The invention will be easily understood with the aid of the following description and accompanying drawing, in which:—

Like numerals of reference indicate corresponding parts in each figure.

Figure 1:
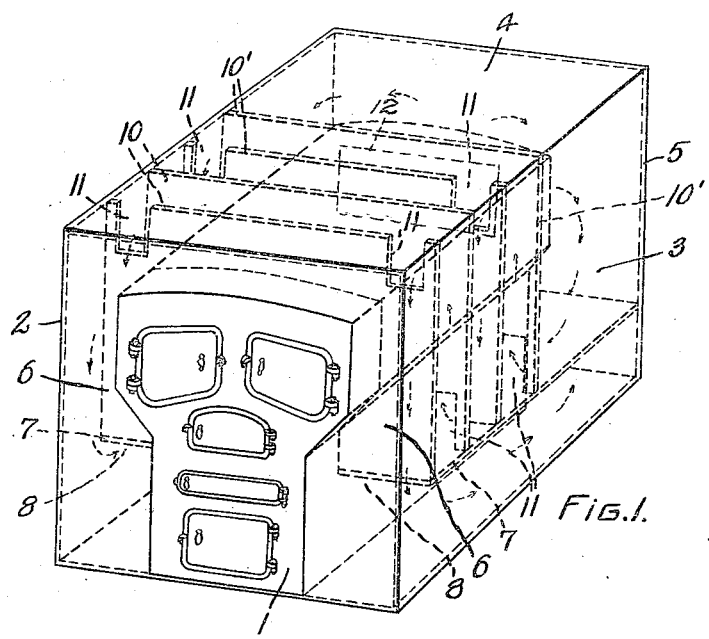
Figure 1 is a perspective view of the invention adapted to a furnace of the horizontal type.

Referring to the drawings, 1 is a furnace of the horizontal type having a smoke outlet at one end, covered on four of its sides by the side walls 2 and 3, the top wall and rear wall 4 and 5, respectively. Each of these walls is spaced apart from the furnace to form an open space therebetween. The open space between the walls of the furnace and the casing walls, at the front of the furnace, is closed by a wall 6 which fits snugly over the furnace. The walls are suitably secured together forming a casing around the furnace. Adjacent the lower inner portion of said casing is a horizontal partition 7 which extends the whole width of the space formed between the furnace and walls of the casing, thus dividing the space into two sections. The partition 7 is cut short adjacent the front wall 6, in order to form the openings 8. In the rear wall is connected a pipe 9 which communicates with the lower section formed by the partition 7.

In the upper section, a plurality of vertical dividing partitions 10 is provided, said partitions extending from the top wall to the partition 7, and from the side wall 2 to the side wall 3, thus completely dividing the upper section into a plurality of spaces, and 11 are openings in each of said partitions arranged in zig-zag arrangement in relation to each other, so that the fumes and hot gases passing through the smoke outlet 12 in the rear wall of said furnace will pass through said openings 11 in a wavy circulation, through the openings 8 leading to the conduit formed by the partition 7, back into the rear of the furnace and through the pipe 9 to the chimney.

Figure 2:
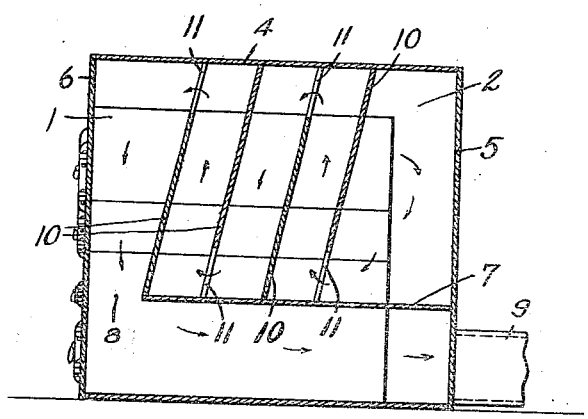
Figure 2 is a vertical sectional side view of a modified form of the invention.

In the construction shown in Fig. 2, the partitions 10', instead of being vertical, as in the first form, are disposed obliquely, such arrangement tending to retard the hot gases and fumes and naturally increase the heating efficiency of the furnace. In all other respects, the two constructions are identical.

What I claim as my invention is:

1. The combination with a heating furnace having a smoke outlet at one end, of an external casing enclosing the furnace and spaced therefrom; a horizontal partition disposed intermediate the top and bottom of the space formed between the walls of the casing and furnace and dividing said space into upper and lower sections, said partition terminating short of the front wall of the casing to provide an opening, and the lower section having a smoke outlet communicating with it; and a plurality of spaced, parallel partitions in the upper section connected at opposite ends with the top wall of the casing and the horizontal partition, each of the parallel partitions having an opening.

2. The combination with a heating furnace having a smoke outlet at one end, of an external casing enclosing the furnace and spaced therefrom; a horizontal partition disposed intermediate the top and bottom of the space formed between the walls of the casing and furnace and dividing said space into upper and lower sections, said partition terminating short of the front wall of the casing to provide an opening, and the lower section having a smoke outlet communicating with it; and a plurality of spaced, parallel partitions in the upper section straddling the furnace and connected at opposite ends with the top wall of the casing and the horizontal partition, each of the parallel partitions having an opening.

3. The combination with a heating furnace having a smoke outlet at one end, of an external casing enclosing the furnace and spaced therefrom; a horizontal partition disposed intermediate the top and bottom of the space formed between the walls of the casing and furnace and dividing said space into upper and lower sections, said partition terminating short of the front wall of the casing to provide an opening, and the lower section having a smoke outlet communicating with it; and a plurality of obliquely-disposed partitions arranged in spaced, parallel relation in the upper section and connected at opposite ends with the top wall of the casing and the horizontal partition, each of the parallel partitions having an opening.

4. The combination with a heating furnace having a smoke outlet at one end, of an external casing enclosing the furnace and spaced therefrom; a horizontal partition disposed intermediate the top and bottom of the space formed between the walls of the casing and furnace and dividing said space into upper and lower sections, said partition terminating short of the front wall of the casing to provide an opening, and the lower section having a smoke outlet communicating with it; and a plurality of obliquely-disposed partitions arranged in spaced, parallel relation in the upper section and connected at opposite ends with the top wall of the casing and the horizontal partition, said parallel partitions straddling the furnace and being provided with openings.

Signed at Montreal, Quebec, Canada, this 26th day of January, 1921.

ARISTIDE HARRY DES PAROIS.

Witnesses:
    C. PATENAUDE,
    G. BEAUDOIN.